Patented Mar. 11. 1930

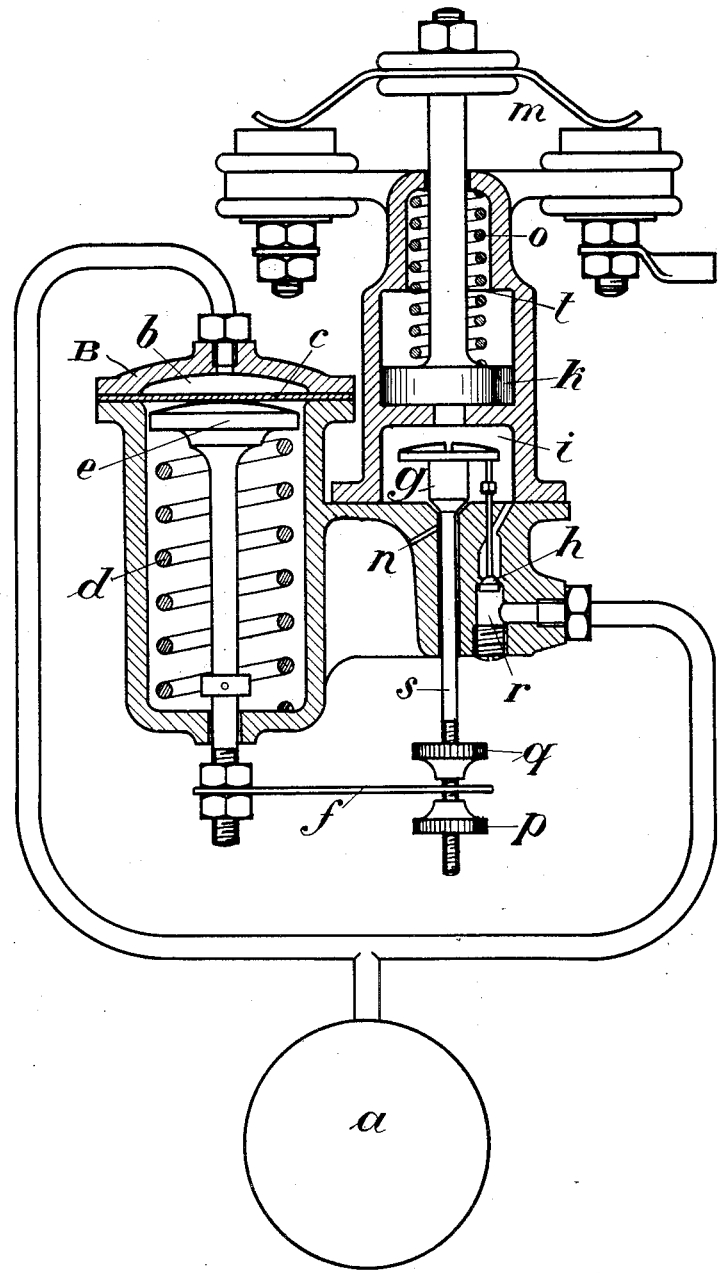

1,750,341

UNITED STATES PATENT OFFICE

ALBERT AICHELE, OF BADEN, SWITZERLAND, ASSIGNOR TO AKTIENGESELLSCHAFT BROWN, BOVERI AND CIE., OF BADEN, SWITZERLAND

AUTOMATIC PRESSURE-OPERATED SWITCH

Application filed May 23, 1921, Serial No. 471,684, and in Switzerland June 2, 1920.

This invention has for its object to provide an improved apparatus whereby an electric motor driving a compressor shall be set in operation when the pressure in the compressed air storage vessel fed by the compressor has sunk to a given minimum, and shall be thrown out of operation when the pressure in the said storage vessel has risen to a given maximum.

It has already been proposed to effect this object by the use of a diaphragm for controlling the valves of an auxiliary pneumatic engine for the electric switch.

The invention consists more particularly in an improved construction of the two control valves which, according to the invention, are made dependent upon each other.

For the purpose of obviating burning of the switch contacts due to a creeping motion of the valves, and of obtaining a sudden operation of the latter, each of the two valves is loaded, when closed, with the air pressure existing in the system, and is relieved suddenly of this load immediately after the valve has been opened by the said diaphragm in opposition to the said air pressure.

A constructional example of the improved apparatus and the manner in which it operates, are illustrated in the accompanying drawing.

In the drawing, the portion designated by the reference letter $a$ is the accumulator or compressed air storage vessel with which the chamber $b$ in the regulator casing B above the diaphragm $c$ is in communication. Against this diaphragm there is pressed by a spring $d$ a plunger $e$ which transmits the movements of the diaphragm to a leaf spring $f$. This spring serves to control the two valves $g$ and $h$. The outlet valve $g$ serves to connect the chamber $i$, under the actuating piston $k$ of the switch $m$, with the atmosphere by way of the aperture $n$, whereas the inlet valve $h$ serves to connect the chamber $i$ with the compressed air vessel $a$.

When the inlet valve $h$ is opened, and the outlet valve $g$ is closed, the piston $k$ is quickly raised by the air pressure existing in the accumulator $a$, and thereby the switch $m$ of the motor driving the compressor is opened.

If however the space under the piston $k$ be put into communication with the atmosphere by opening the exit valve $g$, then the spring $o$ will push the piston $k$ into the position shown in the drawing, and thus close the switch $m$. The pressure limits between which the apparatus is to operate, may be adjusted by means of the set nuts $p$, $q$, to vary the permissible lost motion between the leaf spring $f$ and the valve rod $s$.

For the purpose of explaining the manner in which this invention is to be performed, the operation of this improved apparatus will now be described as beginning from the position illustrated in the accompanying drawing where the switch $m$ is shown closed, so that the compressor is running.

Now, as the pressure in the accumulator $a$ rises, the diaphragm $c$ gradually will be bulged in a downward direction against the force of the spring $d$, the leaf spring $f$ being moved toward the set nut $p$ and ultimately into contact therewith. As the pressure in the accumulator approaches the predetermined maximum, the plunger $e$ continues to be moved downwardly, but due to the resiliency of the leaf spring, the movement of the plunger will not immediately unseat valve $g$, but will flex and tension the leaf spring. The air pressure of the accumulator $a$ exists also in the space $r$ below the inlet valve $h$ and acts to hold that valve on its seat. Now, when the tension induced in the leaf spring $f$ and exerted by it upon the set nut $p$ is sufficiently great to overcome the air pressure acting upon the inlet valve $h$, valve rod $s$ will be snapped downwardly, quickly and fully seating valve $g$ and unseating valve $h$. Immediately valve $h$ is unseated, the air loading will be transferred to valve $g$ so that the latter will be held seated and the valve $h$ held unseated. With the unseating of valve $h$, the accumulator pressure will be rendered effective in chamber $i$ to move piston $k$ upwardly with a quick motion against the pressure of its spring $o$ to the limit afforded by the jointing face $t$, thus moving the switch quickly to its fully opened position and placing the compressor out of action. As, in the course of time, the pressure in the accumulator *a* approaches the predetermined minimum limit, the diaphragm *c* will be bulged upwards under pressure of spring *l* to such an extent as to bring the leaf spring *f* into engagement with set nut *q*. When the minimum air pressure is reached, the spring *f* will be sufficiently tensioned to open the outlet valve *g* against the loading pressure in chamber *i*, and this chamber put into communication with the atmosphere through vent passage *n*. Thereby, valve *g* is immediately unloaded and the air compressed under piston *k* immediately exhausted through the hole *n*, and the switch *m* will be closed suddenly by the spring *o*. Simultaneously with the opening of the valve *g*, the superior pressure existing in the space *r*, will act to close the inlet valve *h*, which latter will remain closed under load of the accumulator pressure until the maximum pressure has been re-established in the accumulator *a*, whereupon the above described series of operations will be repeated.

The use of the spring *f* is intended to provide the sudden operation of the valves with a certain amount of reserve force derived from the stressing of the spring so as to insure full opening and closing movements, and further to counteract and render innocuous any possible reaction upon the diaphragm *c* due to the sudden opening of the valves *g* and *h*.

What I claim is:—

1. In apparatus of the class described, the combination with a switch operating piston and its cooperating cylinder, of an inlet valve and an outlet valve for said cylinder, the outlet valve controlling opening movement of the inlet valve and said valves being movable relative to each other, and a pressure responsive device for operating the outlet valve at critical maximum and minimum pressures.

2. In a switch operating device for compressors, the combination with a switch operating piston and its cooperating cylinder, of an inlet valve and an outlet valve for said cylinder, said valves being movable relative to each other and the outlet valve controlling opening movements of the inlet valve, both of said valves being loaded in their closed positions by the accumulator pressure only, and a pressure responsive device for operating the outlet valve at critical maximum and minimum accumulator pressures.

3. In a switch operating device for compressors, the combination with a switch operating piston and its cooperating cylinder, of an inlet valve and an outlet valve for said cylinder, said valves being relatively movable and the outlet valve controlling opening movements of the inlet valve, said valves closing under the accumulator pressure, and a pressure responsive device for operating the outlet valve at critical maximum and minimum accumulator pressures.

4. In a pressure responsive switch operating device, the combination with a switch operating piston and its cooperating cylinder, of an inlet valve and an outlet valve for said cylinder, said valves being relatively movable and the outlet valve controlling opening movement of the inlet valve, a pressure responsive device for operating the outlet valve at critical maximum and minimum pressures, and a tensionable device whereby the operating force is transmitted from the pressure responsive device to the outlet valve.

5. In a pressure responsive switch operating device, the combination with a switch operating piston and its cooperating cylinder, of an inlet valve and an outlet valve for said cylinder, the outlet valve controlling the opening and closing movements of the inlet valve, a pressure responsive device for operating the outlet valve in opening and closing movements, and a tensionable device whereby the operating force is transmitted from the pressure responsive device to the outlet valve.

6. In a pressure responsive switch operating mechanism, the combination with a switch operating piston and its cooperating cylinder, of an inlet valve and an outlet valve for said cylinder, the outlet valve controlling opening and closing movements of the inlet valve, a pressure responsive device for operating the outlet valve at critical maximum and minimum pressures, and a lost motion connection between the pressure responsive device and the outlet valve whereby the latter is operated from the former.

7. In a pressure responsive switch operating mechanism, the combination with a switch operating piston and its cooperating cylinder, of an inlet valve and an outlet valve for said cylinder, one of said valves controlling opening and closing movements of the other, a pressure responsive device for operating the controlling valve at critical maximum and minimum pressures, and a lost motion connection between the pressure responsive device and the controlling valve whereby the latter is operated from the former, the lost motion connection being adjustable to vary the limits of lost motion between the pressure responsive device and the controlling valve.

8. In a pressure responsive switch operating device, the combination with a switch operating piston and its cooperating cylinder, of inlet and outlet valves for said cylinder, the outlet valve controlling opening and closing movements of the inlet valve, a pressure responsive device for operating the outlet valve, a tensionable device whereby the operating force is transmitted from the pressure responsive device to the outlet valve, and a lost motion connection between the tensionable device and the outlet valve.

9. In a pressure responsive switch operating device, the combination with a switch operating piston and its cooperating cylinder, of inlet and outlet valves for said cylinder, one of said valves controlling opening and closing movements of the other, a pressure responsive device for operating the controlling valve, a tensionable device whereby the operating force is transmitted from the pressure responsive device to the controlling valve, and a lost motion connection between the tensionable device and the controlling valve, the lost motion connection being adjustable to vary the limits of lost motion between the tensionable device and the controlling valve.

10. In apparatus of the character described, a switch-operating piston, a cylinder therefor, inlet and outlet valves for said cylinder, open and closed conditions of the inlet valve being dependent upon closed and open conditions respectively of the outlet valve, and fluid-pressure means responsive to predetermined maximum and minimum pressure conditions and being operable at such pressure conditions to effect closing and opening movements respectively of the outlet valve.

11. In apparatus of the character described, a switch-operating piston, a cylinder therefor, inlet and outlet valves for said cylinder, open and closed conditions of the inlet valve being dependent upon closed and open conditions respectively of the outlet valve, fluid-pressure means responsive to predetermined maximum and minimum pressure conditions and being operable at such pressure conditions to effect closing and opening movements respectively of the outlet valve, and a leaf spring carried by said fluid-pressure means for movement therewith and providing an operating connection between the same and said outlet valve.

In testimony whereof I have signed my name to this specification.

ALBERT AICHELE.